United States Patent [19]
Mengel

[11] Patent Number: 4,966,421
[45] Date of Patent: * Oct. 30, 1990

[54] METHOD OF AND STRUCTURE FOR THE JOINING OF SUBSTANTIALLY RIGID PARTS TOGETHER

[76] Inventor: Craig Mengel, 2114 Robinson Street, Regina, Saskatchewan, S4T 2P7, Canada

[ * ] Notice: The portion of the term of this patent subsequent to Nov. 28, 2006 has been disclaimed.

[21] Appl. No.: 420,152

[22] Filed: Oct. 10, 1989

Related U.S. Application Data

[63] Continuation of Ser. No. 221,120, Jul. 19, 1988, Pat. No. 4,883,331.

[30] Foreign Application Priority Data

Jul. 24, 1987 [CA] Canada ................................. 542982

[51] Int. Cl.⁵ ............................................. A47B 17/00
[52] U.S. Cl. .................................................. 312/195
[58] Field of Search ................... 312/257 R, 111, 195; 108/157, 159; 220/4 F; 403/13, 14

[56] References Cited

U.S. PATENT DOCUMENTS

| | | |
|---|---|---|
| 2,549,943 | 4/1951 | Snider . |
| 2,681,483 | 6/1954 | Morawetz .............................. 403/14 |
| 3,029,207 | 2/1963 | Deaton . |
| 3,346,311 | 10/1967 | Bears . |
| 3,401,995 | 9/1968 | Ogden . |
| 3,479,102 | 11/1969 | Wallach et al. . |
| 4,271,566 | 6/1981 | Perina ............................ 52/DIG. 13 |
| 4,372,224 | 2/1983 | Ehrlich ......................... 297/DIG. 6 |
| 4,635,418 | 1/1987 | Hobgood ..................... 52/DIG. 13 |
| 4,883,331 | 11/1989 | Mengel ................................ 312/195 |

Primary Examiner—Joseph Falk
Attorney, Agent, or Firm—Irell & Manella

[57] ABSTRACT

Conventionally, substantially rigid parts such as panels and the like, are joined by mechanical fitments or couplers which not only require tools to asemble and disassemble but also create concentrated stress points at the junctions where the fitments or couplers are located. The present device utilizes hook and loop coupling material to detachably secure the parts together and incorporate mechanical location and aligning means between the two parts just prior to the engagement of the hook and loop fastener portions with one another thus facilitating the accurate assembly of the parts. Although designed primarily for use in various types of knock-down furniture and the like, it can of course be adapted for use with other substantially rigid parts.

5 Claims, 4 Drawing Sheets

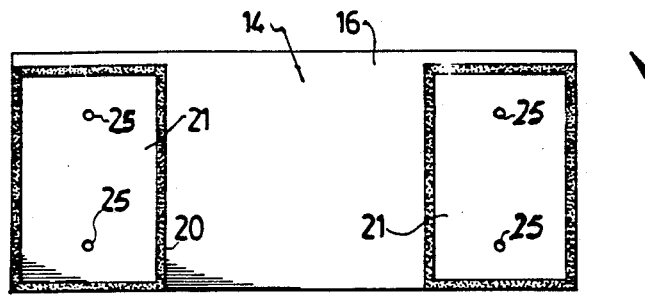
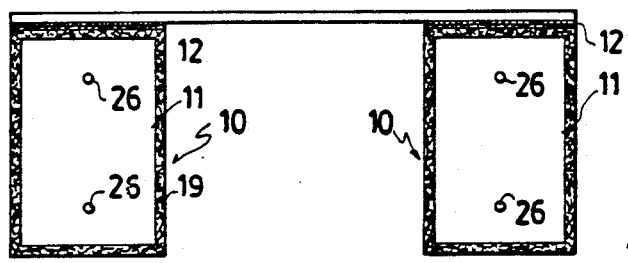
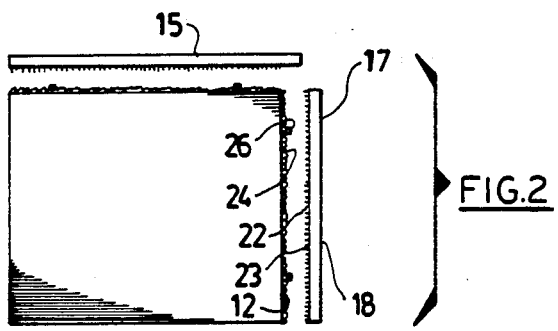
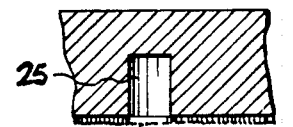
FIG.3
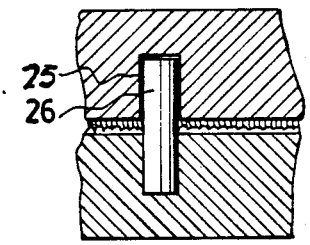
FIG.4
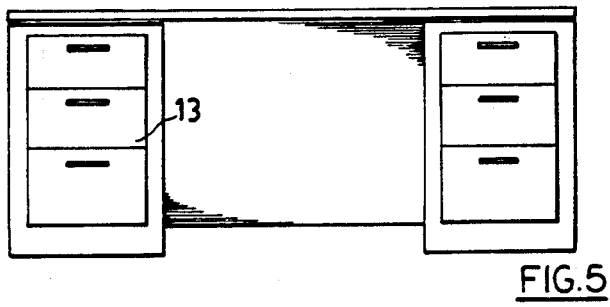
FIG.5

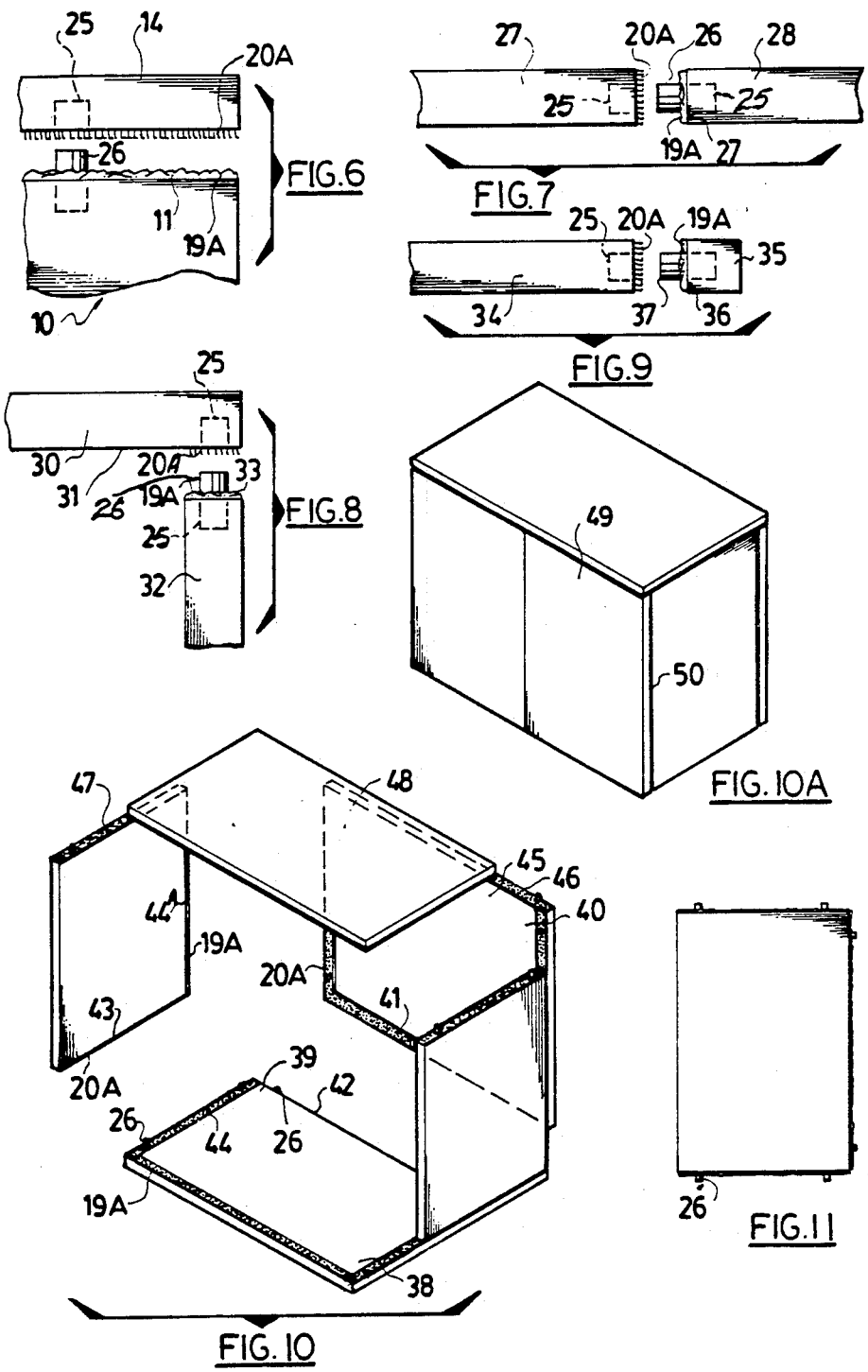

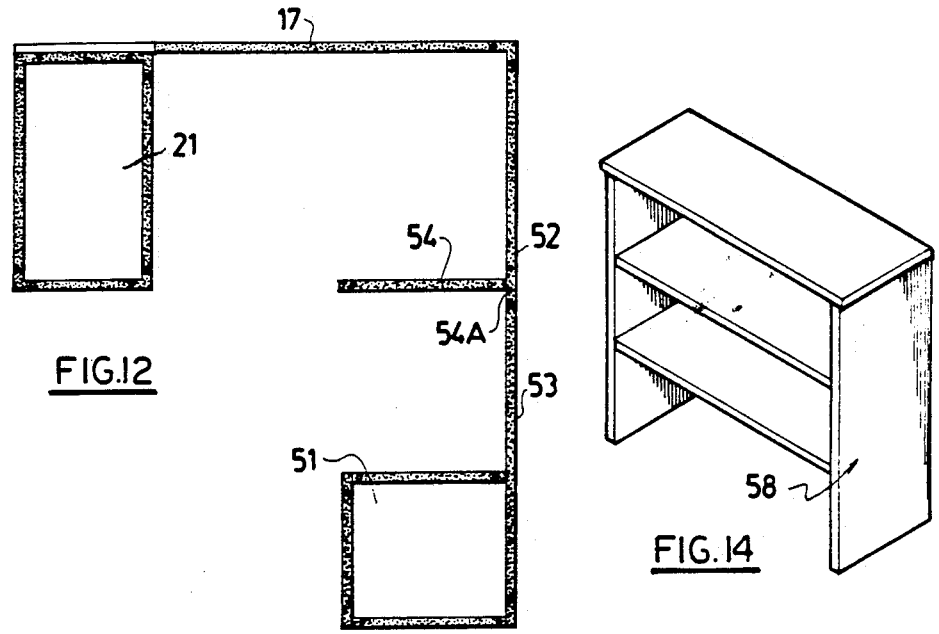
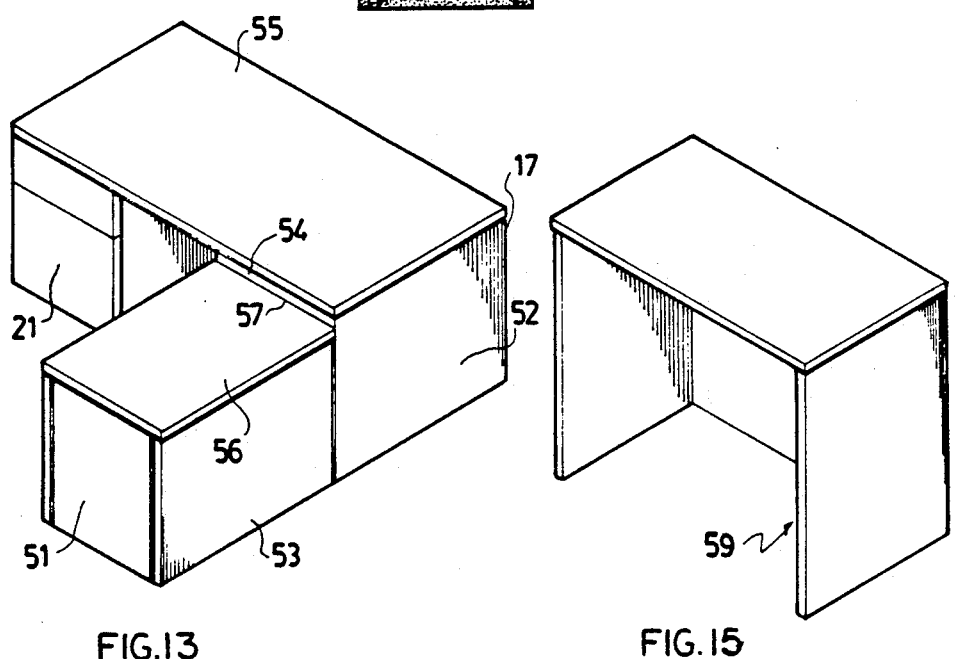

METHOD OF AND STRUCTURE FOR THE JOINING OF SUBSTANTIALLY RIGID PARTS TOGETHER

The present application is a continuation of application Ser. No. 221,120, filed July 19, 1988, now U.S. Pat. No. 4,883,331.

BACKGROUND OF THE INVENTION

This invention relates to new and useful improvements in method and structure for attaching two or more substantially rigid parts together and although the majoritY of the description and the illustrations refer to knock-down furniture of one form or another, nevertheless it will be appreciated that the method and structure can readily be adapted for use with other assemblies whether made of wood, plastic or metal.

The conventional way of securing such parts together utilizes a variety of fastening devices all of which consist of various fitments or couplers requiring tools to assemble and disassemble same and which, in use, create a concentrated stress point at the junction which is often weakened and sometimes breaks away when stresses are applied such as in moving the assembled parts without disassembly beforehand.

Furthermore in order to attempt to provide the necessary strength at the location of said fitments or couplers, the thickness of the material utilized in the construction of the parts is often increased considerably adding to the cost and usually, when a pressed wood is used, utilizing a less dense material than is available in thinner cross-sections.

Insofar as furniture is concerned, whether it be office furniture or home-use furniture, it may be shipped already assembled or, in a knocked down condition.

If already assembled, it will be appreciated that shipping space and storage space is considerable and the transferral of such assembled furniture is sometimes difficult particularly when narrow staircases, doorways and the like are encountered.

Knocked-down furniture is becoming increasingly popular largely due to the speed and ease of assembly and the less space required for both storage and transportation.

However conventional knocked-down furniture is still somewhat difficult to assemble on-site and normally requires at least two operators.

As an example, an office desk may be shipped conventionally in some five packages containing six pieces and once these are unpacked, the following steps are required in order to assemble the desk.

First the top of the desk is turned upside down upon the floor whereupon one end panel is placed upside down on the top panel aligning and engaging the male and female fitments and securing same usually by use of a screwdriver or wrench, in order to turn screws into all of the female fitments to secure and tighten the end panel upon the top of the desk.

Male fitments of the back panel are then engaged into the bottom of the top of the desk and the male fitments of the back panel are engaged with the female fitments of the side of the end panel whereupon the screws are tightened in all of the female fitments in order to secure these panels.

The other end panel is attached in a similar manner as described and then the drawers are taken out of the pedestals which may then be turned upside down and aligned so that the male fitments engage with the female fitments on the bottom of the desk top. All of the fitments are then tightened with a screwdriver or wrench and the desk can then be turned over to the upright position. This usually requires two assemblers in order to prevent damage from occurring to the desk. However some considerable strain is placed upon the fitments or couplers during this operation. Once turned upright, the drawers may be placed back in the pedestals.

PRIOR ART

Prior art known to applicant is as follows:

U.S. Pat. No. 3,079,207, C. U. Deaton, Feb. 26, 1963. This discloses a bi-level desk utilizing conventional screw type fasteners and brackets.

U.S. Pat. No. 3,401,995, B. R. Ogden, Sept. 17, 1968. This shows knock-down desks, tables and the like furniture detachably secured together by brackets, bolts, clamps and the like.

U.S. Pat. No. 2,549,943. L. Snider, Apr. 24, 1951. This teaches a knock-down desk having metal bracket fasteners, hinges and the like.

U.S. Pat. No. 3,479,102, M. K. Wallach et al, Nov. 18, 1969. This patent discloses furniture construction including a sub-assembly in which a rigid three-box unit is provided with finish panels attached to the sub-assembly and includes bulkheads for strength. A U-shaped member extends to the top of the desk and a pair of flat bar members are welded to the U-shaped member through pins and screws are utilized to secure the various parts together.

U.S. Pat. No. 3,346,311, W. W. Bears; Oct. 10 1967. This includes a bolted assembly engagable in U-shaped cutouts or keyhole type cutouts together with hinged latches engaged by screws.

U.S. Pat. No. 3,807823, George T. Rouse, Apr. 30, 1974. This patent discloses a lightweight corrugated collapsible desk with interlocking panels and tabs to hold the panels in position once folded.

U.S. Pat. No. 4,186,976, A. Okada, Feb. 5, 1980. Disclosed is a fabricated desk in which the components are rigidly interconnected by locking devices interposed between locking mechanism mounting apertures provided at suitable locations.

U.S. Pat. No. 4,372,224, Richard A. Ehrlich, Feb. 8, 1983. Ehrlich discloses a knockdown table construction in which a table pedestal is assembled from two leg units and a rail connected by wedging hook connectors, themselves described in Ehhlich's U.S. Pat. No. 4,165,902. The table top is grooved on the underside to receive the tops of the leg units. According to Ehrlich this is essential to provide the necessary strength in the table construction. The table top is retained in the assembled position by hook and loop fasteners along the tops of the table legs and the bases of the grooves. To employ the structure taught by Ehrlich, it is necessary to use a thick table top capable of being grooved as taught without a significant loss of structural strength. This excludes he use of relatively thin, less expensive materials, for example particle board. Likewise, the mechanical hook connectors between the rail and the leg pedestals is unsuitable for use with relatively thin, pressed wood panels.

SUMMARY

The present invention overcomes disadvantages inherent with conventional fitments or couplers for rigid panels, structures or the like by utilizing hook and loop material such as "Velcro" (TM) which includes two portions coupled together, one portion consisting of rows of hooks and the other portion comprising a mass of small loops. When these two portions are pressed together, they form a highly secure closure yet can easily be reopened with a relatively simple peeling action.

In combination with the hook and loop fastening means, a mechanical aligning system is utilized so that the two parts to be fastened together by the hook and loop fastening material can be perfectly aligned one with the other just prior to the mating of the two portions of the hook and loop fastening material. It will of course be understood that without some method of aligning the parts accurately prior to coupling the hook and loop portions, considerable difficulty can be experienced in accurate alignment.

According to one aspect of the present invention there is provided, in an article of knock down furniture comprising a plurality of panels joined face to face by hook and loop fastener material with two detachably engageable portions secured to opposed faces of adjacent panels, mechanical alignment means for aligning the panels in a predetermined alignment, said mechanical alignment means comprising:

dowel means secured to and projecting from one of the opposed faces of adjacent panels and engageable with the other of the opposed faces for preventing engagement of the fastener material portions, and aperture means in the other of the opposed faces for receiving the dowel means when the panels are in the predetermined alignment, whereby the portions of the fastener material are allowed to come into engagement only in the predetermined alignment.

According to another aspect of the present invention there is provided knock down furniture which comprises:

at least two substantially flat, rigid panels;

fastener means for detachably securing the panels together in a predetermined relationship to define the furniture, the fastener means comprising at least one strip of hook and loop fastening material having a predetermined thickness, with one portion of the strip secured to a substantially planar mating face of one of the panels and the other portion of the strip secured to a substantially planar mating face of the other panel for separable engagement of the two fastener portions when the panels are in the predetermined relationship; and alignment means for mechanically aligning the panels in the predetermined relationship, the alignment means comprising two dowels projecting perpendicularly from one of the mating faces, the dowels projecting a distance greater than the predetermined thickness of the strip of fastening material, two apertures in the other of the mating faces for receiving respective ones of the dowels when the panels are arranged in the predetermined relationship.

In accordance with a further aspect of the present invention there is provided knock down furniture comprising:

a rectangular back panel having front and back planar, rectangular major surfaces, two end edge faces, a top edge face and a bottom edge face;

two end panels each having inner and outer major rectangular surfaces, a front edge face a back edge face, a top edge face and a bottom edge face, each end panel projecting forwardly from the front major surface of the back panel, adjacent its end edge faces;

a top panel overlying the top edge faces of the end and back panels, the top panel having planar, rectangular top and bottom major surfaces, two end edge faces, a front edge face and a back edge face;

fastener means comprising strips of hook and loop fastener material, including two first strips of fastener material each with one portion secured along the top edge face of a respective end panel and another portion secured to the bottom face of the top panel, a second strip having a portion extending along the top edge face of the back panel and another portion secured to the bottom face of the top panel, two third strips each having a portion extending along and secured to the back edge face of a respective end panel and another portion secured to the front face of the back panel; and alignment means comprising two spaced apart dowels projecting from the back edge face of each end panel, two spaced apart dowels projecting from the to edge face of each end panel, two spaced apart dowels projecting from the top edge face of the back panel, four apertures in the front face of the back panel for receiving the dowels projecting from the back edge faces of the end panels and six apertures in the bottom face of the top panel for receiving the respective dowels projecting from the top edge faces of the end and back panels.

Advantages of the invention include economy of manufacture, ease of storage and transportation, compatibility and interchangeability of components, sufficient strength of the fastening material and much more rapid assembly and disassembly of the finished pro duct.

In the latter case, and utilizing the example of a desk assembly with the hook and loop fastening and mechanical alignment system, the following steps are required once a total of four packages are unpacked. These packages may include four pieces, the top or desk panel, the back panel and two pedestals.

First the back panel is placed and engaged with the back of the two pedestals and then the top desk panel is placed on top of the pedestals.

Assembly of such a desk with the hook and loop fastening means takes less than one minute with one assembler as opposed to conventional desks which take up to five to ten minutes with two assemblers. Transporting and unpacking time is also reduced with fewer packages and the disassembly of the desk using the hook and loop fastening means is relatively simple. It is only necessary to pull off the top and back portions and the desk is ready to move and assemble at a new location and it should be stressed that no tools are necessary in either assembly or disassembly.

Furthermore, the simplicity of the fastening system overcomes many design problems of knock-down furniture systems thus resulting in flexibility as there is no need for components to be designed to accommodate an particular fastening system.

The components are designed for a number of uses as will hereinafter become apparent and then the hook and loop material together with the mechanical aligning means are strategically placed on all of the components to allow for easy and effortless interchangeability thereof.

This of course simplifies the manufacturing process because there are no fitments or mechanical couplers to be secured to the component surfaces which require pre-drilling, countersinking and attachment.

The hook and loop portions of the fastening material are simply glued or otherwise attached to the component surfaces thus eliminating concentrated stress points normally occurring with other types of coupling devices and because of the lack of concentration of the attaching load, there are no weak areas of the actual joining of two adjacent surfaces.

This of course means that manufacturing is not only more simple but less labour and capital intensive as the proposed system requires fewer manufacturing steps and less sophisticated machinery.

As mentioned previously, conventional coupling or joining systems necessitate the use of particle board of a minimum thickness of 1" in order to accommodate conventional fitments and in some instances, particle board of 1⅛" in thickness is required.

By contrast, the proposed system can utilize ¾" (or less) particle board which is of a higher density, is less flexible and less prone to rupture thus reducing material costs by approximately 30% and having a product which is easier to handle and assemble, has less weight thus reducing freight charges and producing a finished product which is stronger and is less prone to warpage.

The most common occurrence of breakage with conventional systems is the breakup of the particle board at the concentrated stress points. These breaks are usually not repairable and therefore require replacement of one or more components. Even when repair is possible, the original strength is not restored to the repaired area. When utilizing hook and loop fastening material as in the present invention, there is no chance of particle board breakout and the system does not require additional components such as cross members or the like, to strengthen the product.

Another advantage of the present invention is that even particle board shrinks or expands with temperature and humidity and this can increase stress at concentrated stress points which occur in conventional systems thus causing breakage or looseness of the connecting fitments whereas the hook and loop fastening material allows expansion and contraction thus eliminating this problem.

In conventional systems, that employ suspended pedestals in their design, desk top warpage is a common problem whereas with the hook and loop attachment system described, full length pedestals can be utilized thus eliminating warpage as well as the need for end panels.

This means that there are fewer pieces to manufacture, ship and assemble thus reducing the incident of damage and space requirements for inventory at both wholesale and retail levels.

Conventional systems utilize a plurality of fastening devices whereas the present system uses only one fastening device for all system components and the simplicity of design allows interchangeability of components without the need of additional fastening devices.

Any seams between the hook and loop materials can be hidden or highlighted because the hook and loop material is currently available in a wide range of colors and of course additional colors may be ordered if desired.

These seams can form a conventional design feature known as a reveal strip which at the present time, must be added as an additional step in the manufacturing process.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a schematic view of a desk assembly showing the two pedestals together with the desk top panel shown reversed and ready for installation.

FIG. 2 is an exploded side view of the desk.

FIG. 3 is an enlarged fragmentary view showing one part of the alignment means.

FIG. 4 is an enlarged fragmentary cross-sectional view showing the alignment device between two adjacent surfaces.

FIG. 5 front view of the assembled desk.

FIG. 6 is an exploded fragmentary view showing one method of between two adjacent parts.

FIG. 7 shows an exploded fragmentary view illustrating an edge to edge connection.

FIG. 8 is an exploded fragmentary view showing an edge to surface junction.

FIG. 9 is an exploded fragmentary view showing an edge to post junction.

FIG. 10 is an exploded view of an open fronted cabinet utilizing the invention.

FIG. 10A shows an assembled cabinet of FIG. 10 but with doors added.

FIG. 11 is an end elevation of one of the end panels of FIG. 10

FIG. 12 is a top plan view of a secretarial desk without the upper or desk top panels attached.

FIG. 13 is an isometric view of the completed desk of FIG. 12 .

FIG. 14 is an isometric view of a bookcase assembly.

FIG. 15 is an isometric view of a desk unit with an open front and base.

In the drawings like characters of reference indicate corresponding parts in the different figures.

DETAILED DESCRIPTION

Figure 19:
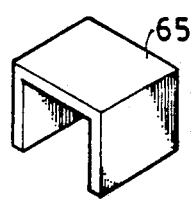
FIG. 19 is an isometric view of one of the C-clips.

In the enclosed description and drawings, knockdown type office furniture is shown including various components and divider panels but it will of course be appreciated that the same principles of hook and loop material attachment of parts together with the mechanical prealigning of these parts is suitable for use in home furniture and in many other environments depending upon design parameters.

It will also be appreciated that although "Velcro" (TM) is mentioned, other hook and loop fasteners are obtainable from various sources all of which have similar components, namely, a flexible or substantially rigid base upon which rows of Nylon (TM) (or other plastic materials) hooks are formed on one portion and a similar base for the other portion which supports a mass of loops (formed from similar materials) engageable by the hooks of the first portion to provide an extremely strong bond therebetween which although readily peelable one from the other, nevertheless supplies sufficient strength for the attachment of the various parts described and claimed herein and is particularly resistant to shear and tension type stresses.

When utilizing relatively long lengths of such hook and loop material to attach panels such as desk top panels and backs, to supporting structures such as pedestals and the like, prealignment of the parts is an essential feature because of the difficulty in accurately positioning such panels upon the supporting structure surfaces and although the mechanical alignment means described and illustrated consists of dowels an apertures to receive same in the matching parts, nevertheless other mechanical alignment means may be utilized such as downwardly extending edge flanges and the like. Also, this mechanical prealignment adds rigidity to the assembled structure.

Proceeding therefore to describe the invention in detail, reference should be made to the attached drawings which are exemplary only and have been included and described to fully illustrate the principles of this invention, namely, to attach relatively rigid parts to one another utilizing hook and loop fastening material together with prealignment means so that the parts are accurately positioned just prior to the engagement of the fastening materials.

FIGS. 1 to 5 show the system utilized with an office desk and is illustrative and exemplary only.

The desk shown in FIGS. 1 and 2 includes a pair of pedestals 10 having planar upper surfaces 11 and planar rear surfaces 12. Drawers and/or doors illustrated schematically by reference character 13 may be provided within the pedestals and construction thereof is conventional.

A desk top panel 14 comprises a substantially rectangular panel having any desired finish on the upper side 15 thereof and shown in FIG. 1 with the underside 16 facing uppermost.

Also provided is a substantially rectangular rear panel collectively designated 17 which is also a rectangular panel with any desired finish on the outer surface 18 and which will be positioned against the rear surfaces 12 of the pedestals when assembled.

Around the perimeter of the upper surfaces 11 of the pedestals, is secured, as by adhesive or other means, strips 19 of one portion of hook and loop fastening material with corresponding opposite strips of hook and loop material 20 being secured as by adhesive or the like around the areas 21 of the desk top panel which are to be engaged upon the two pedestals when the desk top panel is assembled thereon.

Similar strips of one portion of hook and loop material 22 are secured around and define the attaching area of the inner surface 23 of the rear panel with the opposite strips of hook and loop material 24 being secured around the perimeters of the rear panels 12 of the two pedestals. Although perimetrical locations are shown for the hook and loop material, other positions and/or configurations of such material may be used.

Mechanical prealigning means are provide between the upper surfaces of the pedestals and the underside of the desk top and between the inner surfaces of the rear panel and the rear surfaces of the pedestals and in all cases, these prealigning means, in the present embodiment, take a similar form and are illustrated in fragmentary enlarged views 3 and 4.

Drilled apertures (preferably blind apertures) 25 are formed in both mating surfaces and in alignment one with the other when the two surfaces are accurately positioned and a dowel 26 is engaged within the aperture 25 of the stationary component and extends perpendicularly therefrom and the length of these dowels is such that prior to engagement within the matching aperture 25, the mating portions 19 and 20 of the hook and loop materials are spaced apart and not in engagement with one another.

As an example in the desk shown in FIGS. 1 through 5, dowels 26 extend from corresponding apertures (not illustrated) in spaced apart relationship from the rear of the pedestals and similar dowels extend upwardly from the upper surfaces 11 of the two pedestals and it will be observed that there are two spaced apart dowels and corresponding apertures in both the upper and rear surfaces of the pedestals which are positioned approximately in the desired relationship one from the other.

The rear panel is then offered against the rear surface of one of the pedestals with the dowels extending from the panel, engaging the surface within the area defined by one portion of the hook and loop material. Movement of the rear panel relative to the pedestal permits the engagement of the dowels with the apertures in the rear panel thus ensuring that the accurate location has been obtained one with the other at which time the panel is pushed fully against the rear surface of the pedestal so that the hook and loop portions engage one with the other in detachable fastening relationship.

The other end of the panel is then positioned in a similar manner against the rear of the other pedestal and moved until the dowels engage the apertures 25 of this second pedestal It will of course be appreciated that this second pedestal can be positioned fairly accurately prior to attempting to engage the dowels of the rear panel therewith.

Once the rear panel is attached, the top panel 14 is turned over and rested, by the dowels, upon the upper surface 11 of the two pedestals and moved about until the dowels engage the apertures 25 within the upper surface at which time the two mating surfaces of the hook and loop fastening material engage in detachable sealing relationship one with the other.

This completes the assembly of the desk which is accomplished rapidly and easily and provides the necessary stability due to the strength of the fastening material in both shear and tension and it has been found that vibration or weight during use increases the bonding between the two portions of the hook and loop material. It will also be appreciated at the same time that separation of the components is easily undertaken by the peeling action so that movement of the furniture from one location to another is easily accomplished.

In this particular embodiment described, it will be noted that one type of connection or joint has been described, namely, a surface upon a surface and this type of junction is illustrated in FIG. 6 as for example the engagement of the desk top panel 14 with the upper surface 11 of one pedestal 10. Dowel 26 is in alignment with aperture 25 just prior to the engagement of the hook and loop material which in this instance shows the loop material as indicated by reference character 19A and the hook material by reference character 20A although the material portions can of course be reversed if desired.

FIG. 7 shows an edge to edge attachment means between, for example, a panel 27 and a further panel 28. In this type of attachment or fastening, dowels 26 extend from the edge 27 of one of the panels 28 engaging within an aperture 25 therein and also engaging within an aperture 25 in the other panel 27. Once again one portion 20A of the fastening material extends along the edge of panel 27 and the other portion 19A along the edge of the other panel 28 with the length of the dowel 26 extending from the surface being sufficient to engage the opposite surface prior to the alignment of the two panels and to the sealing engagement of the material portions 19A and 20A.

FIG. 8 shows a still further type of junction or joining of two parts in which a panel 30 includes one portion 20A of the hook and loop material secured along the edge of one planar surface 31 of the panel and having an aperture 25 formed perpendicular to this surface 31. The other panel or portion 32 includes one or more apertures 25 formed in the edge 33 into which dowel 26 may engage and with the other portion 19A being placed along this edge 33 thus forming a right angle junction between two panels or components when engaged as hereinbefore described.

FIG. 9 shows a still further type of junction or joint in which a panel 34 is provided with one portion of the hook and loop material 20A on one edge thereof together with an aperture 25 extending perpendicularly from the edge and a support post 35 having the other portion 19A of the hook and loop material secured along one face 36 thereof and a positioning dowel 26 extending therefrom to engage within the aperture 25 in the panel 34.

In the desk construction described and illustrated in FIGS. 1 through 5, all of the junctions are similar to that shown in FIG. 6.

However with a cabinet such as illustrated in FIGS. 10 and 10A, all of the junctions are similar to that shown in FIG. 8.

In FIG. 10, a rectangular base panel 38 is shown having one portion of the hook and loop material 19A secured all around the perimeter of the upper surface 39 together with corresponding dowels 26 extending upwardly from the surface of the panel and in alignment with the other portion 19A of the material.

The rear panel 40 is also provided with one portion of the hook and loop material 20A on the lower edge 41 thereof together with apertures engageable by the dowels 26 extending from the rear edge 42 of the base panel and this rear panel is first located and then engaged upon the rear edge 42 of the base panel which is provided with the other portion of the hook and loop material (not illustrated).

The side panels are then engaged one after the other upon the base panel and the rear panel with the apertures in the lower edge 43 being located by and then engaged by dowels 26 extending upwardly from the side edges 44 of the base panel 38, it being understood that the hook and loop portions 19A and 20A are provided along the lower edges 43 of these side panels with similar strips 19A and 20A and dowels 26 extending along the vertical rear edges 44A of the side panels and the edges of the planar surface 45 of the rear panel.

Finally the dowels extending upwardly from the upper edge 46 of the rear panel and the upper edges 47 of the side panels ar engaged by the corresponding edges of the top panel 48 prior to the engagement of the matching portions of the hook and loop material secured respectively to the underside planar surface of the top panel around the perimeter thereof and the upper, edges 47 and 46 of the side panels and rear panel respectively. FIG. 11 shows the dowel and aperture relationship of one of the end panels 47 and FIG. 10A shows a cabinet such as that illustrated in FIG. 10 but with doors 49 hinged to the vertical front edges 50 of the side panels.

FIG. 12 shows in plan view, the positioning of components for a secretarial desk which includes a pedestal 21, a rear panel 17, a return pedestal 51, a side panel 52, and a return side panel 53 together with a partial front panel 54A. The attachment of the rear panel 17 to the pedestal is similar to that described in FIG. 1 and the side panel 52 together with the partial front panel 54 are connected together with a junction similar to that illustrated and described in FIG. 8.

The rear panel 53 is secured to pedestal 51 in a manner similar to that of the rear panel 17 to pedestal 21 and the inner end 54 of the rear panel is secured to the edge of the side panel 52 in a manner similar to that shown in FIG. 7.

Once assembled to this point, a desk top 55 is positioned on pedestal 21 and to the upper edges of the rear panel 17 and side panel 52 together with the upper edge of the partial front panel 54 all of which use locating dowels and apertures together with the oppositely coupling portions of the hook and loop material and FIG. 13 shows the assembled secretarial desk.

It will of course be appreciated that the return pedestal 51 and return rear panel 53 can be placed on the opposite side in place of pedestal 21 which may be situated on the opposite end of the desk top panel 55, it merely being necessary to disassemble the parts and reassemble in the desired arrangement. A top panel 56 engages the upper side of pedestal 51 and the rear panel 53 of the return and may also engage the lower side of the partial front panel 54, by the inner transverse edge 57 thereof.

FIG. 14 shows an example of an open shelved bookcase or the like collectively designated 58 utilizing similar joining principles and prealigning methods hereinbefore described and FIG. 15 shows an open type structure collectively designated 59 constructed in a similar manner.

Figure 16:
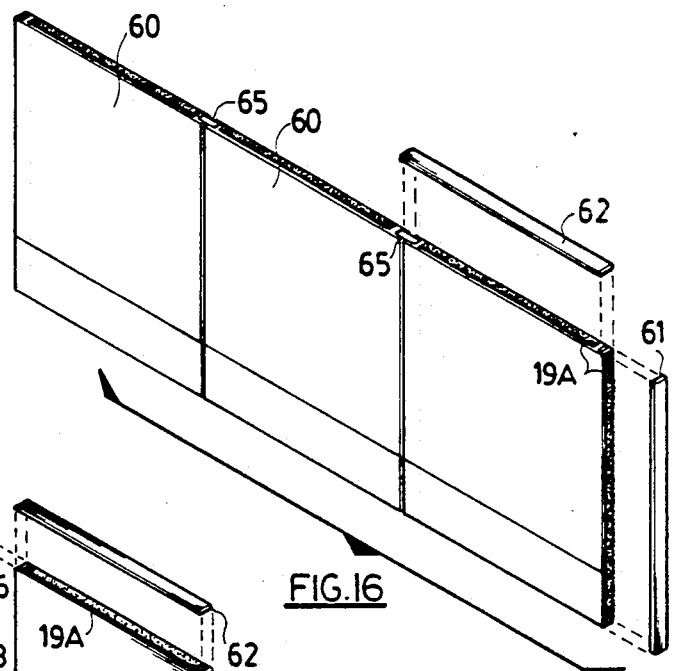
FIG. 16 is an isometric view of divider panels partially exploded.

FIG. 16 shows the alignment of divider panels 60 by utilizing junctions illustrated in FIG. 7 and including the prealigning dowel and aperture system hereinbefore described with end caps 61 engaging the free vertical edges in a conventional manner together with top caps 62.

Figure 17:
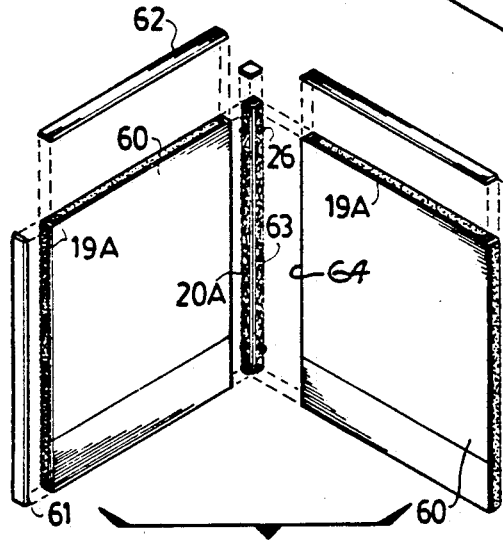
FIG. 17 is a partially exploded view of divider panels and a corner post.
Figure 18:
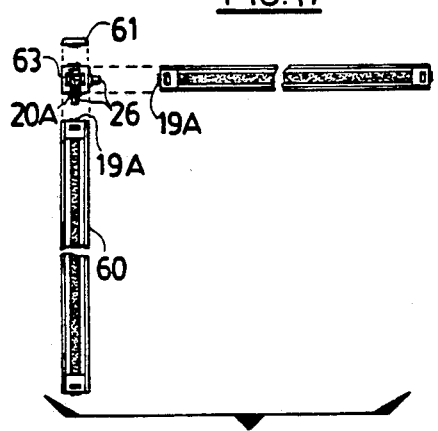
FIG. 18 is a top plan view of FIG. 17.
Figure 21:
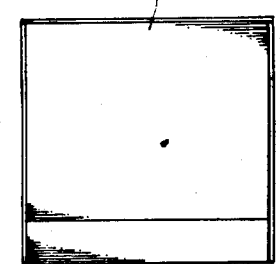
FIG. 21 is a front elevation of a fabric covered panel which may be attached to the frame of FIG. 20.

FIG. 17 shows these panels in conjunction with a corner post 63 shown in exploded form in FIG. 18 with dowels 26 extending from the post and engaging in corresponding apertures within the vertical edges 64 of the panels 60, said edges 64 also having the one portion 19A of the hook and loop material secured thereto with the other portion 20A being secured along the vertical face against which the panels will engage when the dowels have been aligned with apertures within the edges 64 prior to the mating engagement of the hook and loop portions in detachable sealing relationship.

In all cases, C-clips 65 lock the two panels to one another and to the corner post but as such C-clips are conventional, it is not believed necessary to describe same further.

Figure 20:
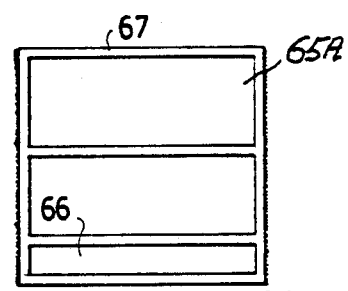
FIG. 20 is a front elevation of an alternative panel frame.

The panels 60 shown in FIGS. 17 and 18 may either be standard panels or may consist of panel frames as shown in FIG. 20 upon which fabric covered panels 65A may be secured together with base caps 65B covering the surface areas 66 of the panel frames 67 shown.

Once again various cap strips such as top caps 62 and end caps 61 may be attached in a conventional manner.

The various types of furniture illustrated are exemplary only and illustrate the flexibility of the hook and loop attaching system together with the mechanical prealigning by means of the dowels 26 and apertures or drillings 25.

The selected furniture pieces also illustrate the potential of interchangeability of parts. For example, the desk illustrated in FIGS. 1 through 5 consists of the four pieces, the upper panel 15, the back panel 17, and two prefabricated pedestals 21.

The dowels 26 are free fitting and their main purpose is to ensure proper alignment and the placement of the two components of the hook and loop material 19A and 20A used on any given surface, is determined by considerations of compatibility and interchangeability with other system components.

However, as mentioned above, they do add some rigidity to the assembled structure particularly to the panel system such as used, for example, in FIGS. 10, 14 and 15-20. In fact, additional dowels may be incorporated for this purpose.

The exact placement of the hook and loop strips or pads or dowels illustrated is only one configuration of the concept.

The secretarial desk shown in FIGS. 12 and 13 is adapted from the executive desk and consists of the identical pieces, namely, the upper or top desk panel 15, the rear panel 17, and one pedestal 21 together with the additional pieces such as end panel 52, partial front panel 54 and the secretarial return 51, 53, and 56.

The secretarial desk shown in FIGS. 12 and 1 may not only be changed from left to right return but can also be converted into an executive desk by replacing the end panel 52 and partial front panel 54 with a pedestal 21 and removing the secretarial return components and vice versa.

Similarly, the various bookcase and cabinet structures can all be shipped in a flat package and can be stacked one upon the other or can use one with doors and one without or separate doors for one or more shelves or full length doors and shelf height may also be adjusted readily. The structure shown in FIG. 15 is similar to the structure shown in FIG. 10 but without a base and without a shelf and the storage unit of FIG. 10A is also readily adapted from the bookcase whether it be two or three shelves in height.

Although the corner post shown in 17 and 18 illustrate a right angled junction between adjacent panels, nevertheless these are readily adapted for a three or four way panel junction or, alternatively, the corner posts may be constructed to effect 45 degrees or other corner angles desired.

The top caps and end caps are optional and offer design potential as do the base panels or caps 65B which cover the surface cavity 66 provided for electrical, telephonic and other services. These services may be provided continuously through the panel by means of punchouts (not illustrated) at the base of the vertical edge of each panel or by the means of plug units (not illustrated) at the base of the vertical edges of such panels. The punchouts on the base cap covers are provided for the installation of service outlets and the principle advantage of the system described is the use of hook and loop material for end to end connection of the panels in combination with the prealignment by mechanical means such as the dowels. This system is completely interchangeable and readily assembled and disassembled and the simplicity of the design lends itself to the incorporation of additional features presently in use with other divider or panel systems.

Since various modifications can be made in my invention as hereinabove described, and many apparently widely different embodiments of same made within the spirit and scope of the claims without departing from such spirit and scope, it is intended that all matte contained in the accompanying specification shall be interpreted as illustrative only and not in a limiting sense.

I claim:

1. In an article of knock down furniture comprising a plurality of panels joined face to face by hook and loop fastener material with two detachably engageable portions secured to opposed faces of adjacent panels, mechanical alignment means for aligning the panels in a predetermined alignment, said mechanical alignment means comprising:
    dowel means secured to and projecting from one of the opposed faces of adjacent panels and engageable with the other of the opposed faces for preventing engagement of the fastener material portions, and aperture means in the other of the opposed faces for receiving the dowel means when the panels are in the predetermined alignment, whereby the portions of the fastener material are allowed to come into engagement only int eh predetermined alignment.

2. Knock down furniture which comprises:
    at least two substantially flat, rigid panels;
    fastener means for detachably secured the panels together in a predetermined relationship to define the furniture, the fastener means comprising at least one strip of hook and loop fastening material having a predetermined thickness, with one portion of the strip secured to a substantially planar mating face of one of the panels and the other portion of the strip secured to a substantially planar mating face of the other panel for separable engagement of the two fastener portions when the panels are in the predetermined relationship; and
    alignment means for mechanically aligning the panels in the predetermined relationship, the alignment means comprising two dowels projecting perpendicularly from one of the mating faces, the dowel projecting a distance greater than the predetermined thickness of the strip of fastening material, two apertures in the other of the mating faces for receiving respective ones of the dowels when the panels are arranged in the predetermined relationship.

3. Furniture according to claim 2 wherein said one of the mating faces comprises an edge face of the associated panel and the other of the mating faces comprises a major surface of the associated panel.

4. Furniture according to claim 2 wherein the mating faces comprise edge faces of the associated panels.

5. Knock down furniture comprising:
    a rectangular back panel having front and back planar, rectangular major surfaces, two end edge faces, a top edge face and a bottom edge face;
    two end panels each having inner and outer major rectangular surfaces, a front edge face a back edge face, a top edge face and a bottom edge face, each end panel projecting forwardly from the front major surface of the back panel, adjacent its end edge faces;

a top panel overlying the top edge faces of the end and back panels, the top panel having planar, rectangular top and bottom major surfaces, two end edge faces, a front edge face and a back edge face;

fastener means comprising strips of hook and loop fastener material, including two first strips of fastener material each with one portion secured along the top edge face of a respective end panel and another portion secured to the bottom face of the top panel, a second strip having a portion extending along the top edge face of the back panel and another portion secured to the bottom face of the top panel, two third strips each having a portion extending along and secured to the back edge face of a respective end panel and another portion secured to the front face of the back panel; and alignment means comprising two spaced apart dowels projecting from the back edge face of each end panel, two spaced apart dowels projecting from the top edge face of each end panel, two spaced apart dowels projecting from the top edge face of the back panel, four apertures in the front face of the back panel for receiving the dowels projecting from the back edge faces of the end panels and six apertures in the bottom face of the top panel for receiving the respective dowels projecting from the top edge faces of the end and back panels.

* * * * *

REEXAMINATION CERTIFICATE (1973rd)
United States Patent [19]
Mengel

[11] B1 4,966,421
[45] Certificate Issued  Apr. 6, 1993

[54] METHOD OF AND STRUCTURE FOR THE JOINING OF SUBSTANTIALLY RIGID PARTS TOGETHER

[76] Inventor: Craig Mengel, 2114 Robinson Street, Regina, Saskatchewan, S4T 2P7, Canada

Reexamination Request:
No. 90/002,609, Jan. 15, 1992

Reexamination Certificate for:
Patent No.: 4,966,421
Issued: Oct. 30, 1990
Appl. No.: 420,152
Filed: Oct. 10, 1989

Related U.S. Application Data

[63] Continuation of Ser. No. 221,120, Jul. 19, 1988, Pat. No. 4,883,331.

[30] Foreign Application Priority Data

Jul. 24, 1987 [CA] Canada .................................. 542982

[51] Int. Cl.⁵ ............................................. A47B 17/00
[52] U.S. Cl. .................................. 312/195; 312/263; 312/265.5
[58] Field of Search ..................... 312/257.1, 195, 111, 312/263, 265.5; 108/157, 159; 403/13, 14; 24/306, 442; 52/DIG. 13, 582, 584, 586

[56] References Cited

U.S. PATENT DOCUMENTS

3,658,107  4/1972  Perina .
3,971,608  7/1976  Gans .
4,439,971  4/1984  Rutherford ..................... 312/263 X
4,491,166  1/1985  Hanna ......................... 52/DIG. 13
4,635,418  1/1987  Hobgood ...................... 52/DIG. 13

FOREIGN PATENT DOCUMENTS

378043    6/1985   Austria .
1125236   3/1962   Fed. Rep. of Germany .
1309343  10/1962   France .
81710     9/1963   France .
2416671   9/1979   France .
51-11561  6/1971   Japan .
50-37709  8/1973   Japan .
50-93912 12/1973   Japan .
53-71002 11/1976   Japan .
53-114420 2/1977   Japan .
58-8352   7/1981   Japan .
58-43245  9/1981   Japan .
60-83429 11/1983   Japan .
61-136930 2/1985   Japan .
62-95627 12/1985   Japan .
2178651A  2/1987   United Kingdom .

*Primary Examiner*—Peter R. Brown

[57] ABSTRACT

Conventionally, substantially rigid parts such as panels and the like, are joined by mechanical fitments or couplers which not only require tools to asemble and disassemble but also create concentrated stress points at the junctions where the fitments or couplers are located. The present device utilizes hook and loop coupling material to detachably secure the parts together and incorporate mechanical location and aligning means between the two parts just prior to the engagement of the hook and loop fastener portions with one another thus facilitating the accurate assembly of the parts. Although designed primarily for use in various types of knock-down furniture and the like, it can of course be adapted for use with other substantially rigid parts.

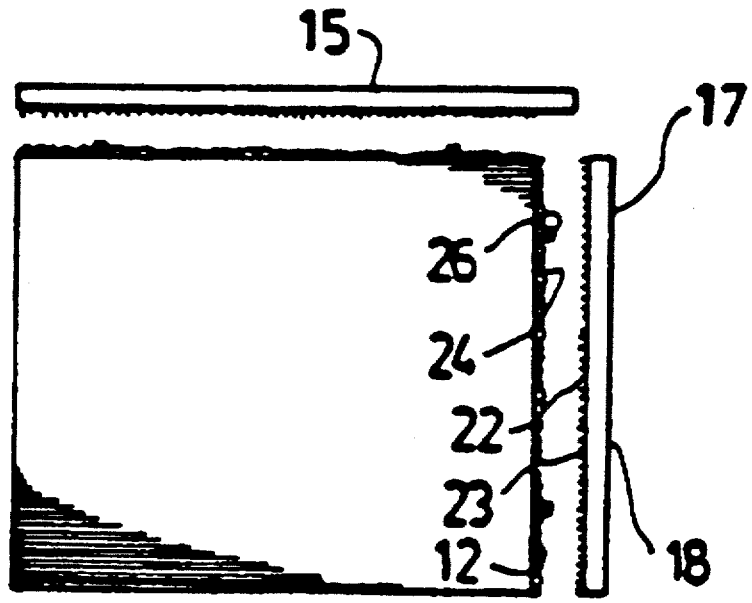

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 5 is confirmed.

Claims 1 and 2 are determined to be patentable as amended.

Claims 3 and 4 dependent on an amended claim, are determined to be patentable.

New claims 6-12 are added and determined to be patentable.

1. In an article of knock down furniture comprising a plurality of panels joined face to face by hook and loop fastener material with two detachably engageable portions secured to opposed faces of adjacent panels, mechanical alignment means for aligning the panels in a predetermined alignment, said mechanical alignment means comprising:
    dowel means secured to and projecting from one of the opposed faces of adjacent panels and engageable with the other of the opposed faces for preventing engagement of the fastener material portions, and aperture means in the other of the opposed faces for receiving the dowel means *in sliding and non-threaded engagement* when the panels are in the predetermined alignment, whereby the portions of the fastener material are allowed to come into engagement only [int eh] *in the* predetermined alignment.
2. Knock down furniture which comprises:
at least two substantially flat, rigid panels;
fastener means for detachably [secured] *securing* the panels together in a predetermined relationship to define the furniture, the fastener means comprising at least one strip of hook and loop fastening material having a predetermined thickness, with one portion of the strip secured to a substantially planar mating face of one of the panels and the other portion of the strip secured to a substantially planar mating face of the other panel for separable engagement of the two fastener portions when the panels are in the predetermined relationship; and
alignment means for mechanically aligning the panels in the predetermined relationship, the alignment means comprising two dowels projecting perpendicularly from one of the mating faces, the dowel projecting a distance greater than the predetermined thickness of the strip of fastening material, two apertures in the other of the mating faces for receiving respective ones of the dowels when the panels are arranged in the predetermined relationship.

6. *An article of knock down furniture comprising:*

*plurality of panels joined face to face by hook and loop fastener material with two detachably engageable portions secured to opposed faces of adjacent panels; and*

*mechanical alignment means for aligning the panels in a predetermined alignment, said mechanical alignment means comprising dowel means secured to and projecting from one of the opposed faces of adjacent panels and engageable with the other of the opposed faces for preventing engagement of the fastener material portions, and aperture means in the other of the opposed faces for receiving the dowel means in sliding and other than mating threaded engagement therebetween when the panels are in the predetermined alignment, whereby the portions of the fastener material are allowed to come into engagement only in the predetermined alignment.*

7. *An article according to claim 6 wherein the dowel means comprise at least two dowels projecting from one of the opposed faces and the aperture means comprise at least two apertures in the other of the opposed faces for receiving respective ones of the dowels when the panels are in the predetermined alignment.*

8. *An article according to claim 7 wherein the fastener material comprises a continuous elongate strip extending between two dowels.*

9. *An article according to claim 6 wherein said one of the opposed faces comprises an edge face of the associated panel and the other of the opposed faces comprises a major surface of the associated panel.*

10. *An article according to claim 9 wherein the fastener material comprises a strip of one portion of the fastener extending along said edge face and a mating strip of the other portion of the fastener extending along said major surface.*

11. *An article according to claim 6 wherein the opposed faces comprise edge faces of the associated panels.*

12. *An article according to claim 11 wherein the fastener material comprises strips of the fastener material portions extending along respective ones of said edge faces.*

* * * * *